L. S. CAMP.
COLLAPSIBLE TRUCK TOP.
APPLICATION FILED DEC. 31, 1918.
1,376,250.
Patented Apr. 26, 1921.
3 SHEETS—SHEET 1.
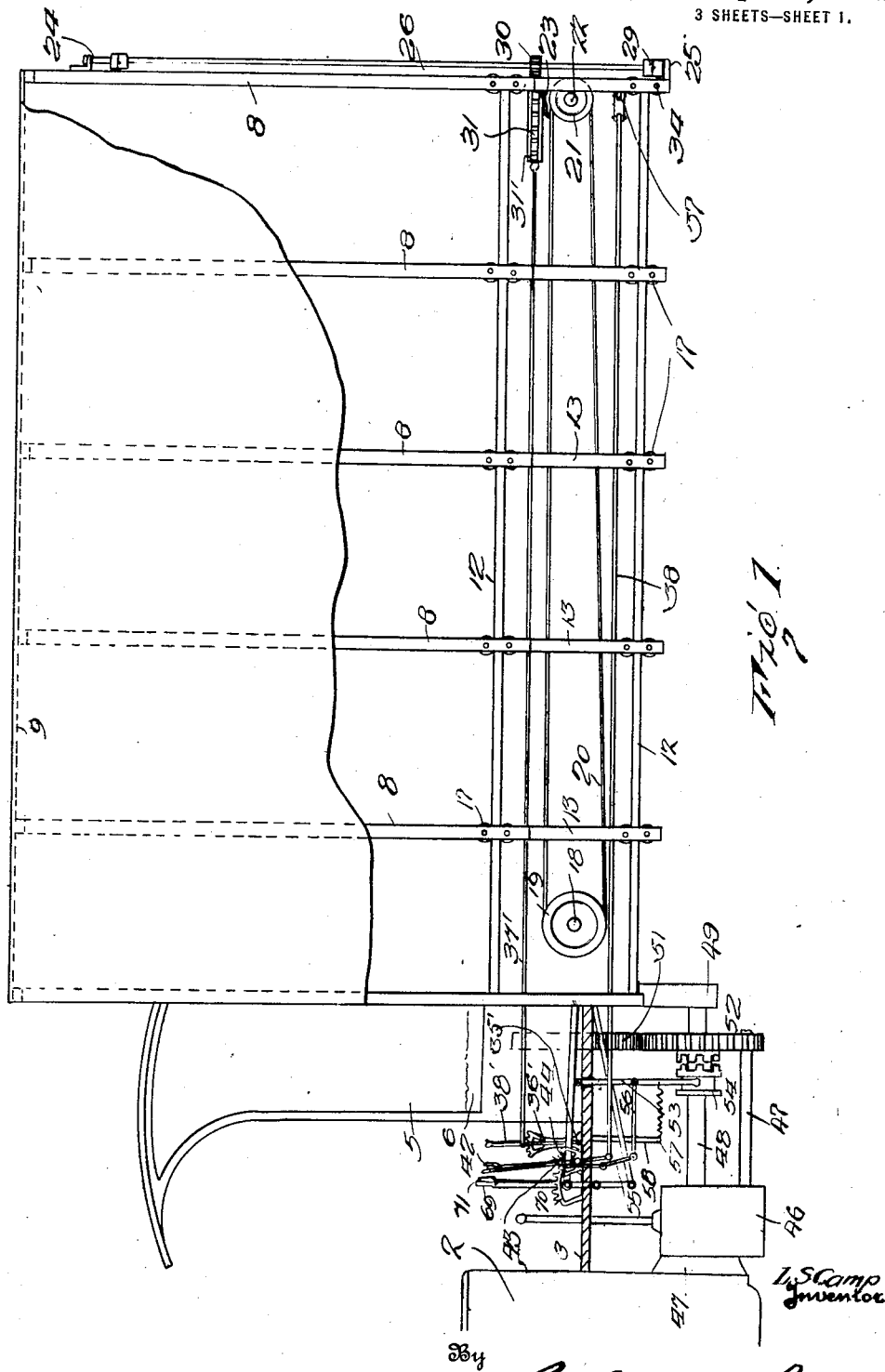

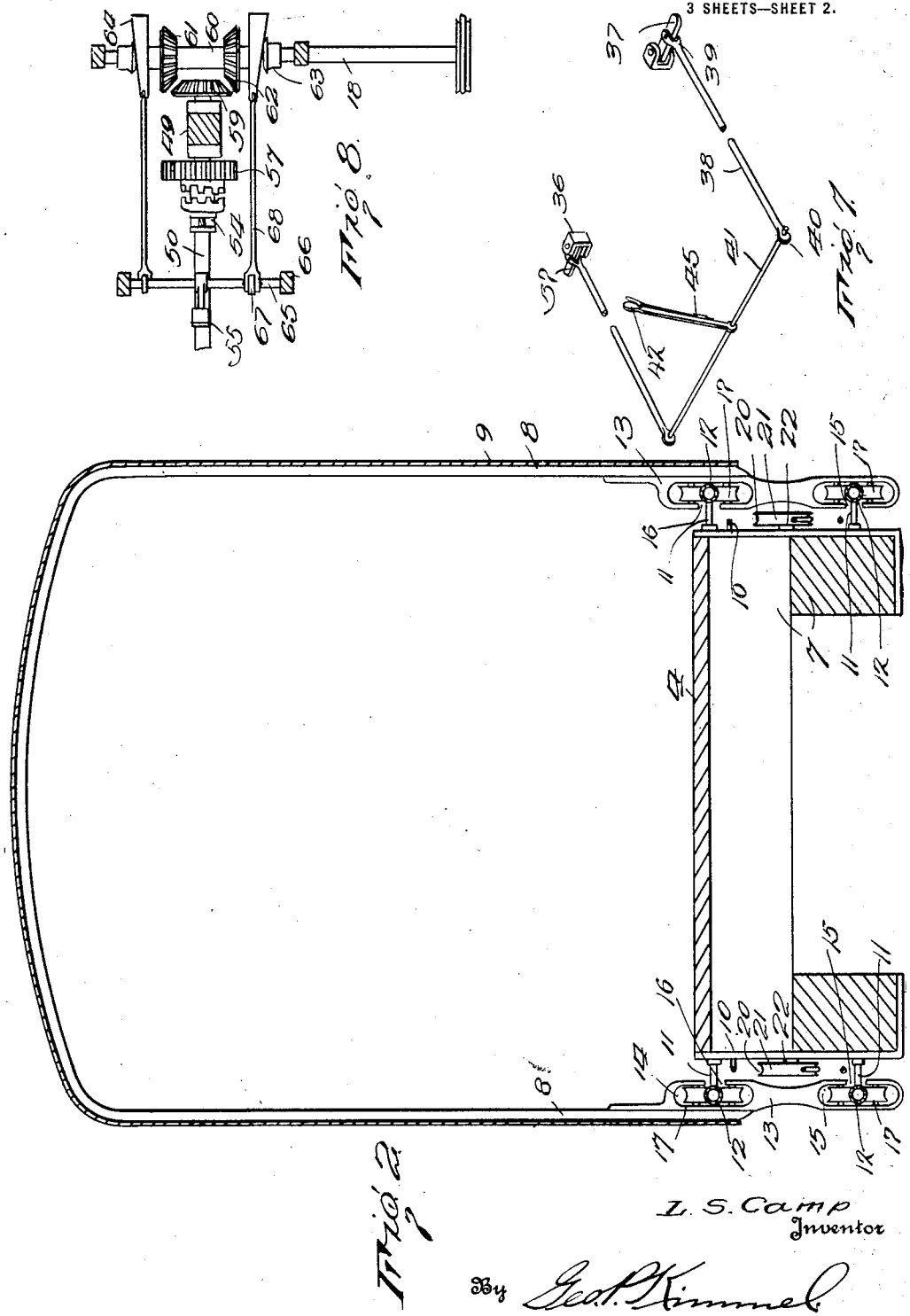

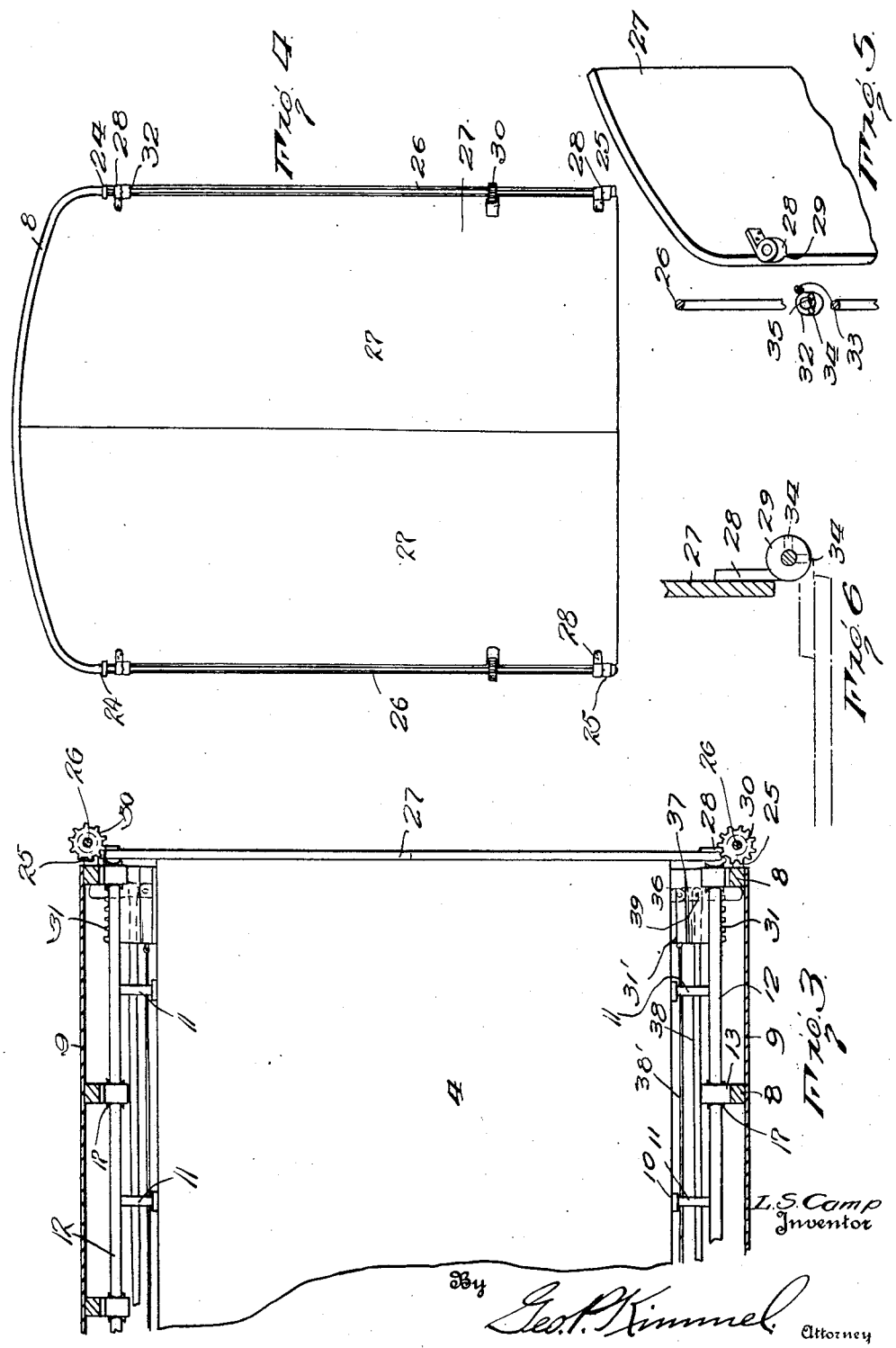

UNITED STATES PATENT OFFICE.

LUTHER S. CAMP, OF ROCK MART, GEORGIA.

COLLAPSIBLE TRUCK-TOP.

1,376,250.  Specification of Letters Patent.  Patented Apr. 26, 1921.

Application filed December 31, 1918. Serial No. 269,061.

*To all whom it may concern:*

Be it known that I, LUTHER S. CAMP, a citizen of the United States, residing at Rock Mart, in the county of Polk and State of Georgia, have invented certain new and useful Improvements in Collapsible Truck-Tops, of which the following is a specification.

This invention comprehends generally improvements in that class of inventions known as carriages and wagons and more particularly relates to a collapsible truck top.

The invention has for its primary aim and object to provide a device of the above mentioned character designed especially to cover the platform of a motor operated truck, the component parts being of novel construction and are in operative connection with the motive power of the truck and under the control of the driver thereof so that the top in its entirety may be easily arranged in an extended operative or a collapsed position as desired so that in consequence the platform of the truck may be conveniently loaded.

It is an additional and equally important object of this invention to provide a device of the above mentioned character wherein doors are provided and mounted on the rear arched supporting member of the top while acting in conjunction therewith is coöperative means on the pivotal supporting rod and on the body of the truck for insuring of the automatic closing or opening of the doors in timed relation with the extending and collapsing of the top or independently thereof.

More particularly, this invention contemplates the provision of a device of the above mentioned character wherein operating mechanism of novel construction is employed and operatively connected with the transmission mechanism of a motor truck and constructed so as to be adjusted by the driver for consequently insuring of the extending or collapsing of the truck top as well as closing or opening the doors.

The invention also embraces the provision of a device of the above mentioned character wherein improved manually adjustable or operable means is employed for coacting with the rear arched supporting member of the top for locking or latching such member against accidental movement when the truck top is in an extended position.

More specific objects of this invention consist in the provision of a device of the above mentioned character wherein the arched supporting members which form a part of the top are of novel construction; to provide improved means for slidably mounting the arched supporting members on the platform of the truck; to provide coöperative means on the doors and on the supporting rods therefor for releasably latching the doors in open and closed positions; and to also provide manually operable means for controlling collapsing of the top.

Among the other aims and objects of this invention may be recited the provision of a device of the above mentioned character wherein the number of parts are comparatively few, the construction simple, the cost of production low and the efficiency high.

Other objects, as well as the nature, characteristic features and scope of this invention will be more readily apparent from the following description taken in connection with the accompanying drawings and pointed out in the claims, forming a part of this specification.

The invention is clearly illustrated in the accompanying drawings, in which:—

Figure 1 is a side elevational view of the invention with a portion of the flexible covering broken away, Fig. 2 is a rear elevational view thereof with the doors removed, Fig. 3 is a fragmentary horizontal sectional view showing the means for mounting the arched members and the doors, Fig. 4 is a rear elevational view showing the doors in a closed position, Fig. 5 is a fragmentary perspective detail of the means for mounting the doors, Fig. 6 is an enlarged top plan view of one of the doors as it would appear in a closed position, the dotted lines indicating the position assumed when open, Fig. 7 is a perspective detail of the means for latching the top in an extended position, and Fig. 8 is a plan detail of the means for reversing the movement of the operating means.

Similar characters of reference are employed in all of the above described views, to indicate corresponding parts.

Referring now, more particularly, to the accompanying drawings there is provided a truck in the chassis 1 of which is desirably mounted a motor 2 and mounted on top of the chassis 1 is a body 3 including a platform 4 and a driver's compartment 5 in which is mounted the seat 6 while mounted on the bolsters which support the platform 4 and arranged about platform is the improved collapsible top 7 including a plurality of arched supporting members 8 and a flexible covering 9.

In reducing the present invention to practice a plurality of attaching brackets 10 are employed and are fitted vertically of the ends of the cross bolsters of the truck. Spaced arms 11 extend laterally from the brackets 10 while connected to the outer ends of the horizontally alining arms 11 are track members 12 preferably of cylindrical configuration in cross section. Other brackets 13 are connected rigidly to the inner faces and near the lower ends of the side portions of the arched supporting members 8 and depend vertically therefrom being formed with spaced transverse openings 14 and 15 the outer walls of which are cutaway as at 16 while vertically opposed rollers 17 are journaled transversely of each of the openings 14 and 15 near the upper and lower ends thereof and are designed so as to operate on the adjacent upper and lower track members 12. In this connection it is to be understood that the brackets 13 are attached to all of the arched supporting members 8 with the exception of the forward arched supporting member which is rigidly fastened with the driver's compartment and by reason of the peculiar mounting of the arched supporting members it is apparent that when all of these members which are movable are moved toward the forward member that the top will be in a collapsed position so that the platform may be conveniently loaded but when these members are moved toward the rear end of the truck, the covering 9 of course will be carried therewith so that the top will be in an extended position.

In order that the members 8 may be adjusted or moved to a collapsed or extended position, a shaft 18 is journaled beneath the platform and carries on its respective ends and in a vertical plane laterally of the edges of the bolsters, pulley wheels 19 over which operate cables 20, said cables being also trained about other pulley wheels 21 journaled on stub-shafts 22 which project from the rear bolster of the truck. A flexible connecting element 23 is engaged with each cable 20 and the rear arched supporting member 8. By this arrangement it is apparent that when the shaft 18 is rotated in either direction all of the movable arched supporting members will be shifted in a corresponding direction for the collapsing or extending of the top.

As intimated, improved means has been provided for closing the rear end doors of the body. In reducing this feature of the invention to practice, spaced brackets 24 and 25 project from the rear side edge of the rear arched supporting member 8 and are positioned near the upper and lower ends of the side portions thereof while journaled therein are elongated rods 26. Doors 27 are now employed and have secured thereto near their inner side edges spaced and laterally extending bracket arms 28 and the outer ends of these arms are rigidly connected to the adjacent rods 26. It is preferred that the outer ends of the arms 28 be of an annular configuration to serve as a bearing while the under surface is formed with a lug 29 both for a purpose which will presently appear. Connected to the lower portion of the rods are pinions 30 designed to mesh with relatively stationary rack bars 31 slidable in flanged attaching brackets 31' on plates 10, the number of teeth of which should be sufficient to cause a three-quarter rotation of the rods 26 when the pinions 30 engage the said teeth during the collapsing and extending of the top to open and close the doors 27, the several parts, of course, operating simultaneously.

The rods 26 are carried directly upon the rearmost bow or rear arch supporting member 8 so that the same will move therewith, thus causing the pinions 30 which are arranged in the path of the rack bars 31 to engage therewith, the rack bars 31 being stationary for the purpose of actuating the pinions 30 to rotate the rods 26 for the opening or closing of the doors simultaneously with the collapsing of the top or the extending thereof. It is also to be understood that as soon as the pinions 30 leave the rack bars 31, the doors 27 being in a position parallel with the sides of the top will remain in this position while the top is being and is in a collapsed position. Annular bearing bands 32 are disposed about the rods and removably held rigid therewith by means of suitable clamping devices such as set-screws 33 directly beneath the lower surfaces of the annular bearing portions of the bracket arms 28 while the upper edges of these collars or bands are formed with spaced recesses 34 and 35 designed to receive the depending lugs 29. For instance, when the doors are in a closed position the lug will be engaged in the recess 34 and when in an open position will be engaged in the recess 35, the engagement being such as to prevent accidental dislodgment of the doors from either of their positions yet at the same time engagement is not sufficiently rigid to offer enough resistance to interfere with an effective automatic operation of the doors.

A shaft 35' is rockably mounted transversely of the driver's compartment and has arms 36' projecting therefrom, while connecting rods 37' are operably arranged between the arms and rack bars, so that when the manually adjustable lever 38' on the shaft is shifted, the rack bars will be slid to open or close doors without moving the top.

For the purpose of releasably latching the top in an extended position, brackets 36 extend outwardly or laterally from the end of the rear bolster while pivotally mounted therein are laterally swinging catch bars 37. Connecting rods 38 are now employed and have their rear ends bifurcated and pivoted as at 39 to the catch bars 37 while the forward ends are looped as at 40 and arranged about the respective ends of a transverse rod 41. A manually operable lever 42 is swingably mounted as at 43 above the foot board and at a point between its ends, the lower end being engaged with the intermediate portion of the rod 41, the upper portion operating through a slot in the foot board and positioned to one side of a segmental rack 44. A manually operable spring pressed pawl 45 is associated with the lever 42 and designed to coact with the teeth of the segmental rack 44 in maintaining the latch bars against the forward side edges of the rear arched supporting member 8 to releasably hold the latter against movement or else these catch bars may be swung toward the bolster to permit of the movement of the arched supporting member thereby as is apparent.

With a view toward providing the manually controlled and motor operated means for extending and retracting the top, manually controlled clutch and transmission mechanism generally designated 46 is associated with the drive shaft 47 of the motor or engine 2, while a secondary shaft 48 is arranged through the casing of the transmission mechanism and is operably connected by a gear with an auxiliary gear which latter gear is designed to rotate when the transmission mechanism is in a neutral position to insure of the rotation of the shaft 48. Journaled in a vertically disposed bearing 49, carried by the chassis, is a stub-shaft 50 on which is mounted a gear 51, at one end and in imparting rotation to the shaft 50 another gear 52 is loose on the shaft 48 and is designed to be normally arranged in mesh with the gear 51. Gear shifting mechanism is employed for operating the gear 52 consisting of a depending pivoted yoke 53 on the chassis, the forked end of which is arranged in the collar 54 on the gear 52 keyed to the shaft 48. A pedal 55 is pivotally mounted intermediate its ends beneath the foot board and has the foot portion disposed above the foot board within convenient reach of the driver while the lower end has a link 56 connected thereto the opposite end of which link is pivoted at a point medially of the ends of the yoke 53 and it is apparent that my moving the lever or pedal 55 forwardly the yoke and the collar 54 will be slid rearwardly carrying therewith the gear 52 to mesh it with gear 51. A coiled contractile spring 57 is employed and has its respective ends connected to the lower portion of the yoke and to a rigidly mounted bracket 58 on the chassis, the spring being tensioned to normally hold the clutch in a disengaged position but of course is extensible upon the actuation of the clutch pedal. To impart movement in opposite direction to the cables 20 a bevel gear 59 is mounted on the inner or rear end of the stub-shaft 50. A sleeve 60 is keyed for sliding movement of the shaft 18 and carries near its respective extremities opposed bevel gears 61 and 62 positioned in spaced relation so that when the sleeve is moved in one direction the gear 62 will engage or mesh with the gear 59 and when the sleeve is moved in an opposite direction the gear 61 will mesh with the gear 59. By this arrangement it is of course apparent that rotation of the shaft 18 in different directions will be effected to insure of the extending and collapsing of the top. Carried on the shaft 18 in spaced relation to each other on the ends of the sleeves 16 are convex bearing members 63 while coacting with these members are the adjusting wedges 64 mounted so as to be alternately moved in opposite directions. In effecting such movement of these wedges a shaft 65 is disposed transversely beneath the foot board, and journaled in depending brackets 66 while carried near the opposite ends of the shaft 65 and projecting in opposite directions are arms 67, one of the latter being upwardly directed, while the other is downwardly directed and to the outer ends of which are connected elongated links or connecting rods 68 the opposite ends of which in turn are operatively connected to the adjacent restricted ends of the wedges 64 and an operating lever 69 rises from the shaft 65 and operates through the slot in the foot board while disposed in proximity to the lever is a segmental rack 70 to the teeth of which is associated a manually operable spring pressed pawl 71 mounted in turn on the lever 69 and designed to coact with the segmental rack in maintaining the shaft and consequently the wedges in either of the adjusted positions to ultimately insure of the desired engagement or meshing of either of the gears 61 or 62 with the gear 59 so that the shaft 18 will be rotated in a corresponding direction for the required adjustment of the top.

The mode of operation of the device may be reviewed as follows:

Assuming that the top is in an extended position as shown in Fig. 1 and as it is desired to move the doors to an open position and the top into a collapsed position, the transmission being in neutral position, the lever 69 is adjusted to arrange the gear 61 in mesh with the gear 59 whereupon the clutch pedal 55 is operated to throw the collar 54 and gear 52 in engagement with the gear 51 and as a result imparts rotation to the shaft 50 and this rotary movement is imparted in turn to the shaft 18 by means of the gear 59 which meshes with the gear 61 causing an operation of the cables 20 about the pulley wheels 19 on the shaft 18 and inasmuch as the connecting element 23 is arranged between the cables and the adjacent side portions of the rear arched supporting member 8, the latter will be drawn toward the forward stationary arched supporting member and as all of the other movable arched supporting members lie in the path of movement of the rear arched supporting member it is apparent that all of the arched supporting members will be arranged in close relation with each other immediately in the rear of the driver's compartment 5 exposing practically the driver's platform so that it can be conveniently loaded. Of course during this operation by reason of the fact that the pinions 30 are arranged in mesh with the rack bars 31 rotary motion will be imparted to the rods 26 and partially rotate them a three-quarter turn moving the lugs 29 out of the recesses 34 and swinging the doors from a closed position to a position parallel with the sides of the cover or top so that the lugs 29 will engage the recess 35 approximately at the time that the pinions leave the rack bars 31 and in this manner serve to hold the doors in an open position against accidental displacement.

It is believed in view of the foregoing description that a further detailed description of the operation of this invention is entirely unnecessary. Likewise, it is believed that the advantages of the invention will be readily apparent.

As many changes could be made in the above construction and as many apparently widely different embodiments of this invention could be made without departing from the scope thereof, and it is intended that all matter contained in the above description or shown in the accompanying drawings shall be interpreted as illustrative and not in a limiting sense. It is also to be understood that the language used in the following claims is intended to cover all of the generic and specific features of the invention herein described and all statement of the scope of the invention, which, as a matter of language, might be said to fall therebetween.

Having thus fully described the invention, what is claimed as new and desired to be secured by Letters Patent, is:—

1. In a motor vehicle, in combination with a platform and transmission mechanism thereof, of an extensible and collapsible top operably mounted on the platform, manually controlled means on the platform and operably arranged between the top and the transmission mechanism for extending or collapsing the top, and manually operable means mounted on the platform and engageable with the top for releasably holding the top in an extended position.

2. In a vehicle, in combination, a platform, an extensible and collapsible top operably mounted thereon, means for placing the top in an extended or collapsed position, vertically disposed rods journaled in the rear end of the top, doors carried by the rods, pinions carried by the rods, rack bars normally stationary and slidable on the platform and meshed by the pinions during the extending or collapsing of the top to simultaneously and automatically move the doors into an open or closed position, and manually controlled means for sliding the rack bars to open or close the doors.

3. In a vehicle, in combination, a platform, a collapsible top on the platform, vertically disposed rods journaled at the rear end of the top, doors connected to the rods, pinions carried by the rods, rack bars carried by the sides of the platform and arranged in the path of movement of the pinions, and means to cause the pinions to operate on the rack bars to move the doors into an open position when the top is collapsed and to simultaneously move the doors to a closed position during the extending of the top.

4. in a vehicle, in combination, a platform, a collapsible top, means for placing the top into extended and collapsed position, vertically disposed rods journaled in the side portions of the top, doors carried by the rods, pinions carried by the rods and rack bars carried by the side of the platform and meshing with the pinions during movement of the top whereby to simultaneously move the doors to an open position when the top is being collapsed and also to move the doors into a closed position when the top is being extended.

5. In a vehicle, in combination, a chassis, a platform supported thereby, a driver's compartment at the front end of the platform, a movable top connected with the compartment, vertically disposed rods journaled on the top, doors connected with the rods, pinions carried by the rods, rack bars carried by the sides of the platform and positioned in alinement with the pinions, and means for operating the top in opposite directions, whereby on movement of the top in one direction it will be extended and the pinions will mesh with the rack bars to simultaneously move the doors in closed position and when the top is moved in an opposite direction the same will be collapsed and the pinions will mesh with the rack bars to simultaneously move the doors in a closed position, and when the top is moved in an opposite direction the same will be collapsed and the pinions will mesh with the rack bars to partly rotate the rods thereby simultaneously moving the doors into an open position.

6. In a motor vehicle, in combination with a platform and transmission mechanism thereof, of a top on the platform, vertically disposed rods journaled in the rear end of the top, doors carried by the rods, coöperative engaging means on the opposite sides of the platform for insuring of the positive rotary movement of the rods and manually controlled means on the platform and operatively arranged between the top and the transmission mechanism for automatically causing the doors to be moved into a closed position or moved into an open position.

In testimony whereof, I affix my signature hereto.

LUTHER S. CAMP.